(12) United States Patent
Jussli et al.

(10) Patent No.: US 10,494,100 B2
(45) Date of Patent: Dec. 3, 2019

(54) AIRCRAFT SEAT DEVICE

(71) Applicant: RECARO Aircraft Seating GmbH & Co. KG, Schwaebisch Hall (DE)

(72) Inventors: Zoltan Jussli, Obersulm (DE); Andreas Erb, Schwaebisch Hall (DE)

(73) Assignee: RECARO Aircraft Seating GmbH & Co. KG, Schwä bisch Hall (DE)

( * ) Notice: Subject to any disclaimer, the term of this patent is extended or adjusted under 35 U.S.C. 154(b) by 112 days.

(21) Appl. No.: 15/565,964

(22) PCT Filed: Apr. 8, 2016

(86) PCT No.: PCT/EP2016/057758
§ 371 (c)(1),
(2) Date: Feb. 19, 2018

(87) PCT Pub. No.: WO2016/166027
PCT Pub. Date: Oct. 20, 2016

(65) Prior Publication Data
US 2018/0170549 A1    Jun. 21, 2018

(30) Foreign Application Priority Data

Apr. 13, 2015   (DE) .......................... 10 2015 105 618

(51) Int. Cl.
*B64D 11/06*      (2006.01)
*B64D 11/00*      (2006.01)

(52) U.S. Cl.
CPC .... *B64D 11/0638* (2014.12); *B64D 11/00152* (2014.12)

(58) Field of Classification Search
CPC .................... B64D 11/0638; B64D 11/00152
USPC ........................................................ 297/170
See application file for complete search history.

(56) References Cited

U.S. PATENT DOCUMENTS

| 3,632,161 A | 1/1972 | Arfaras et al. |
| 2012/0206867 A1 | 8/2012 | Pence |
| 2014/0183910 A1 | 7/2014 | Ulbrich-Gasparevic et al. |
| 2014/0373758 A1 | 12/2014 | Pajic |
| 2015/0020715 A1 | 1/2015 | Pajic |

FOREIGN PATENT DOCUMENTS

| DE | 20 2012 105 089 U1 | 3/2013 |
| EP | 2 799 338 A2 | 11/2014 |
| JP | 2013-107572 A | 6/2013 |
| WO | 2013/166067 A1 | 11/2013 |
| WO | 2015/013661 A1 | 1/2015 |

OTHER PUBLICATIONS

German Search Report dated Mar. 9, 2016 for German patent application DE 10 2015 105 618.6(Partial English translation attached).
(Continued)

*Primary Examiner* — Anthony D Barfield
(74) *Attorney, Agent, or Firm* — Posz Law Group, PLC

(57) ABSTRACT

An aircraft seat device has a table module and a PED holder configured for supporting a PED in an operable position on the table module, wherein the PED holder comprises at least one holding element which is pivotally connected to the table module, wherein
the PED holder comprises a pivot bearing unit, which is configured for pivoting the holding element by more than 180 degrees.

17 Claims, 7 Drawing Sheets

(56) References Cited

OTHER PUBLICATIONS

Figure 1:
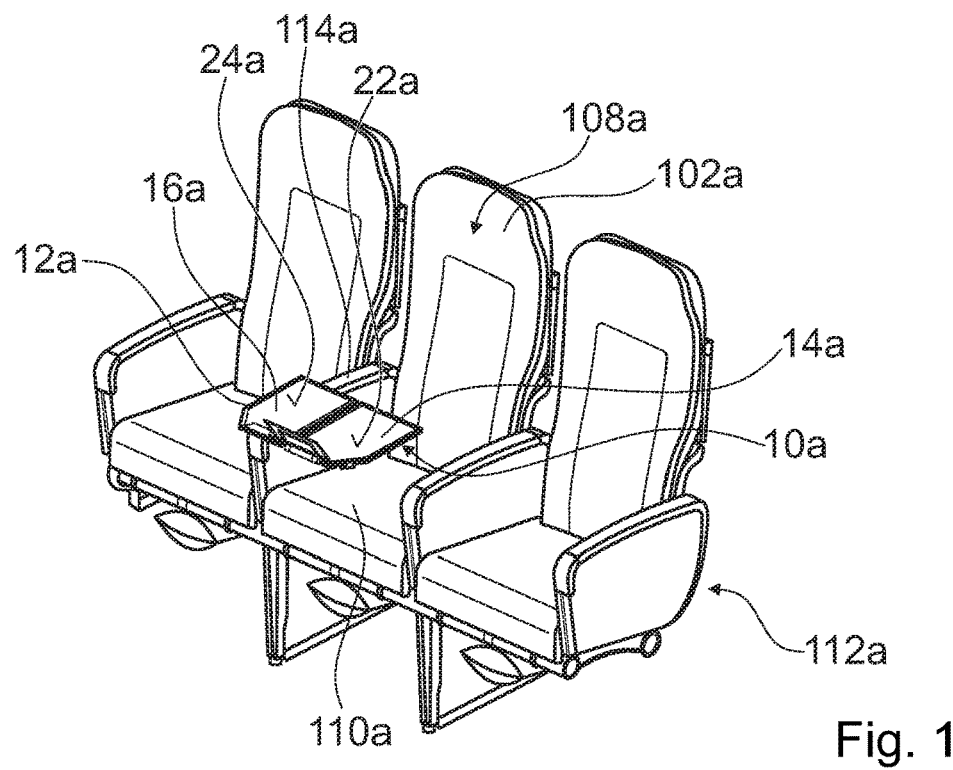

International Search Report of the International Searching Authority dated Jun. 21, 2016 for the corresponding international application No. PCT/EP2016/057758.
International Preliminary Report of Patentability dated Oct. 17, 2017 issued in corresponding International patent application No. PCT/EP2016/057758.

AIRCRAFT SEAT DEVICE

CROSS REFERENCE TO RELATED APPLICATIONS

This application is a U.S. national stage application of PCT/EP2016/057758 filed on Apr. 8, 2016, which is based on German Patent Application No. 10 2015 105 618.6 filed on Apr. 13, 2015, the contents of which are incorporated herein by reference.

STATE OF THE ART

The invention relates to an aircraft seat device according to the preamble of claim 1.

Aircraft seat devices with a table module and with a PED holder configured for supporting a PED in an operable position on the table module, wherein the PED holder comprises at least one holding element, which is pivotally connected to the table module, have already been proposed.

The objective of the invention is in particular to provide a generic device having improved characteristics regarding multi-functionality and comfort. The objective is achieved, according to the invention, by the features of patent claim 1 while advantageous implementations and further developments of the invention may be gathered from the subclaims.

Advantages of the Invention

The invention is based on an aircraft seat device with a table module and with a PED holder configured for supporting a PED in an operable position on the table module, wherein the PED holder comprises at least one holding element, which is pivotally connected to the table module. It is proposed that the PED holder comprises a pivot bearing unit, which is configured for pivoting the holding element by more than 180 degrees. By a "table module" is herein in particular a module to be understood which is configured to provide, at least in one operational state, at least one table surface on which elements may be deposited. A table module is herein implemented as a portion of an aircraft seat device comprising at least one aircraft seat, the table module being configured to provide the at least one table surface for a passenger sitting on the aircraft seat which the table module is allocated to. By a "PED holder" is herein in particular a unit to be understood which is configured to provide at least one accommodation for a PED to ensure that the PED is securely supportable on the holder. By a "PED" is herein in particular a mobile electronic device to be understood, like in particular a tablet computer, a smartphone, an e-book reader, or another mobile electronic device that is deemed expedient by someone skilled in the art. "Configured" is in particular to mean specifically designed and/or equipped. By an object being configured for a certain function is in particular to be understood that the object fulfills and/or carries out said certain function in at least one application state and/or operational state. By an "operable position" is herein in particular a position to be understood in which the PED is supportable by means of the PED holder, as a result of which the PED is operable by a passenger sitting on the corresponding aircraft seat. By the "holding element being pivotally connected to the table module" is herein in particular to be understood that the holding element is supported in such a way that it is rotatable about a pivot axis with respect to the table module and is rotatable about this pivot axis with respect to the table module. Herein the holding element is preferably fixatable in a variety of positions, i.e. in a variety of angle positions to the table module. A fixation of the holding element is herein achievable via a force-fit and/or form-fit connection. It is herein conceivable that the fixation is achieved by a friction-fit connection, e.g. by friction elements which are arranged spaced apart, or by a form-fit connection, e.g. by latch elements which are arranged spaced apart from one another. An implementation according to the invention allows providing an especially multi-functional PED holder, which is usable in a variety of operational states of the table module, thus increasing a comfort for a passenger.

It is furthermore proposed that the holding element is configured to be pivoted, starting from a stowage position, by less than 180 degrees into a first holding position. By a "stowage position" is herein in particular a position of the holding element to be understood in which the holding element is arranged, in a particularly space-saving fashion, on a structure which it is connected to, namely the table module, and in which the PED holder is not usable for holding a PED. The holding element is in the stowage position preferably arranged in a recess that is intended therefor. This allows implementing a first holding position in an especially advantageous manner.

It is also proposed that the holding element is configured to be pivoted, starting from a stowage position, by more than 180 degrees into a second holding position. This allows implementing the PED holder especially variably.

Moreover it is proposed that the table module comprises at least one first table element and at least one second table element, which is supported pivotally to the first table element wherein, in a first operational state, the first table element alone forms a first table surface and, in a second operational state, the two table elements together form a second table surface. By a "table element" is herein in particular an element to be understood which implements the table module at least partially. Herein the table module comprises a plurality of table elements alone or together forming a table surface, wherein the table elements of the table module are embodied movably with respect to one another to provide, alone or together, in a variety of operational states, a table surface, for the purpose of thus providing a variably dimensioned table surface for the passenger according to requirements. A "first operational state" is herein in particular to mean a state of the table module in which only the one table element provides a table surface, the second table element being arranged with respect to the first table element in such a way that the first table element covers the second table element. Principally it would also be conceivable that, in the first operational state of the table module, only the first table element has been brought into a usage position while the second table element is still stowed in a stowage position. A "second operational state" is herein in particular to mean a state of the table module in which the first table element provides the table surface together with the second table element. Herein the entire table surface results from the table surface of the first table element and the table surface of the second table element, which are arranged side by side, in parallel. This allows implementing the table module in an especially flexible fashion.

It is further proposed that the holding element is, in at least one first holding position, configured to provide a holding for a PED in the first operational state of the table module and is, in at least one second holding position, configured to provide a holding for a PED in the second operational state of the table module. This advantageously allows using the PED holder for holding a PED in both operational states of the table module.

Furthermore it is proposed that the pivot bearing unit implements a pivot axis which is oriented in a transverse direction extending orthogonally on a sitting direction of an allocated aircraft seat. "Oriented in a transverse direction" is herein in particular to mean that the pivot axis is implemented in parallel to the transverse direction. The transverse direction is herein implemented as a direction that is oriented from one side of the aircraft seat to an opposite side of the aircraft seat and extends orthogonally to a sitting direction of the aircraft seat. A "sitting direction" is in particular to mean, in this context, a direction that is, in case of a backrest of the aircraft seat being perpendicular to a cabin floor, predetermined by an axis that starts perpendicularly from a main support surface of the backrest. Herein the sitting direction approximately gives a direction in which a passenger sitting on the aircraft seat is sitting. This allows the pivot bearing unit to be implemented for supporting the holding element of the PED holder in an especially advantageous fashion.

It is also proposed that the first table element has a rear end, which the pivot bearing unit is mounted to. By a "rear end of the table element" is herein an end of the table element to be understood that faces away from an aircraft seat which the table module is allocated to. This allows the holding element of the table module to be mounted on the table module in an especially advantageous manner.

Beyond this it is proposed that the pivot bearing unit comprises a latching mechanism, which is configured for blocking the holding element in different positions. By a "latching mechanism" is herein in particular a mechanism to be understood which has a plurality of latching positions which allow a fixation of the latching mechanism. Herein the latching mechanism preferably comprises at least two elements which are movable with respect to each other, each of which comprising a plurality of latch elements embodied correspondingly to each other and configured for a form-fit connection to one another in the different positions. Principally it is also conceivable that the two elements which are movable with respect to each other each comprise a plurality of friction elements which are embodied correspondingly to one another, and/or other force-fit and/or form-fit elements. In this way the holding element is particularly easily fixatable in the different positions by means of the pivot unit.

It is also proposed that the first table element implements a recess, in which the holding element of the PED holder is arranged in a stowage position. By a "recess" is herein a deepening to be understood which has at least the contour of the holding element of the PED holder, as a result of which the holding element is, preferably entirely, arrangeable in the recess. This advantageously allows sinking the holding element of the PED holder in the table module when it is not needed.

Furthermore it is proposed that the recess is arranged in a first side of the first table element. By a "first side of a first table element" is herein in particular a side of the first table element to be understood which is in the first operational state of the table module oriented upwards, implementing the first table surface. This allows implementing the PED holder in a particularly advantageous fashion.

Moreover it is proposed that the recess implements a stop which is configured, in the at least one first holding position, to provide a bracing surface for the PED. By a "bracing surface" is herein in particular a surface to be understood which is configured for allowing a bracing of the PED on it, in particular a bracing with a lower end. Herein the bracing surface preferably features a coating, which is preferably configured to increase a friction coefficient of the bracing surface to ensure a secure support of the PED on the bracing surface. As a result, a bracing for a PED mounted in the PED holder may be rendered available in a particularly simple manner.

It is furthermore proposed that the PED holder comprises at least one bracing element, which is configured, at least in a second holding position, to provide a bracing surface for the PED, and is for this purpose mounted on the second side of the first table element. By a "bracing element" is herein in particular an element to be understood providing, by way of its shaping, a surface that is implemented as a bracing surface for a PED, wherein the bracing element may be embodied as an elevation or a deepening, e.g. a notch. Principally it is also conceivable that the PED holder comprises a securing element, by means of which the PED may be secured in the PED holder, e.g. a rubber band or differently embodied holding elements which are connectable to the PED. In this way, for the second operational state of the table module, a bracing surface may be advantageously rendered available for the PED, allowing the PED to be arranged particularly advantageously and securely in the PED holder in the second holding position.

Further it is proposed that the first table element is in the first operational state arranged on the second table element and implements the table surface with a first side. In this way the table module may be implemented in a particularly advantageously compact and space-saving manner in the first operational state.

Beyond this it is proposed that the first table element is in the second operational state deployed beside the second table element, implementing, with its second side, the second table surface together with a first side of the second table element. In this way the table module is capable of rendering an especially advantageously large table surface available by means of the two table elements.

It is moreover proposed that the table module comprises only one table element that has a rear end which the pivot bearing unit is mounted on. In this way the PED holder may be implemented in an especially advantageous fashion.

The aircraft seat device according to the invention is herein not to be restricted to the application and implementation form described above. In particular, for fulfilling a functionality herein described, the aircraft seat device according to the invention may comprise a number of individual elements, structural components and units that differs from a number that is mentioned herein.

DRAWINGS

Further advantages will become apparent from the following description of the drawings. In the drawings five exemplary embodiments of the invention are shown. The drawings, the description and the claims contain a plurality of features in combination. Someone skilled in the art will purposefully also consider the features separately and will find further expedient combinations.

Figure 2:
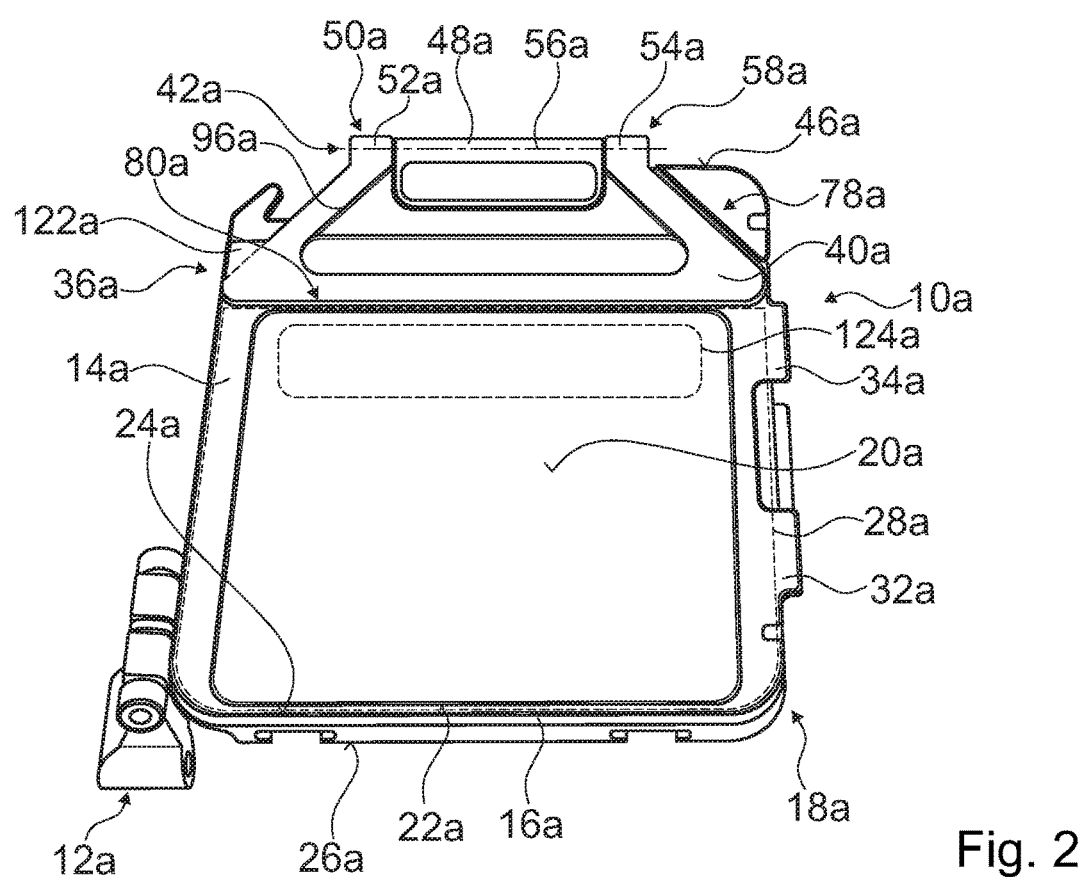
Figure 3:
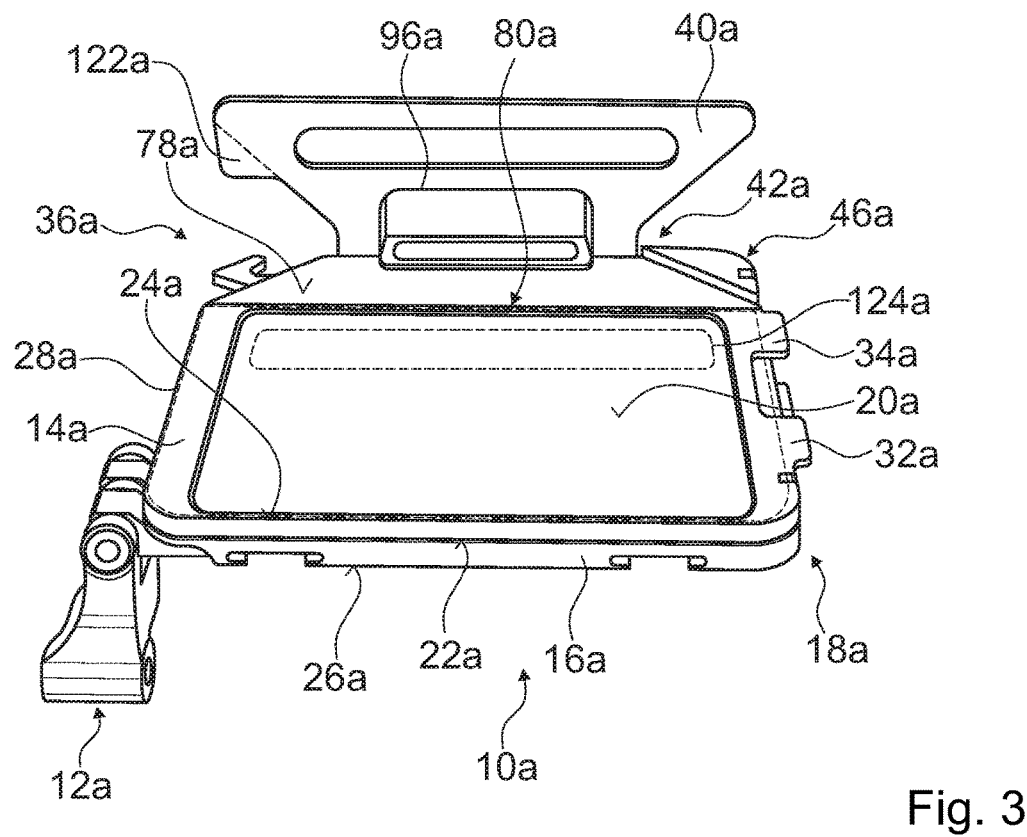
Figure 4:
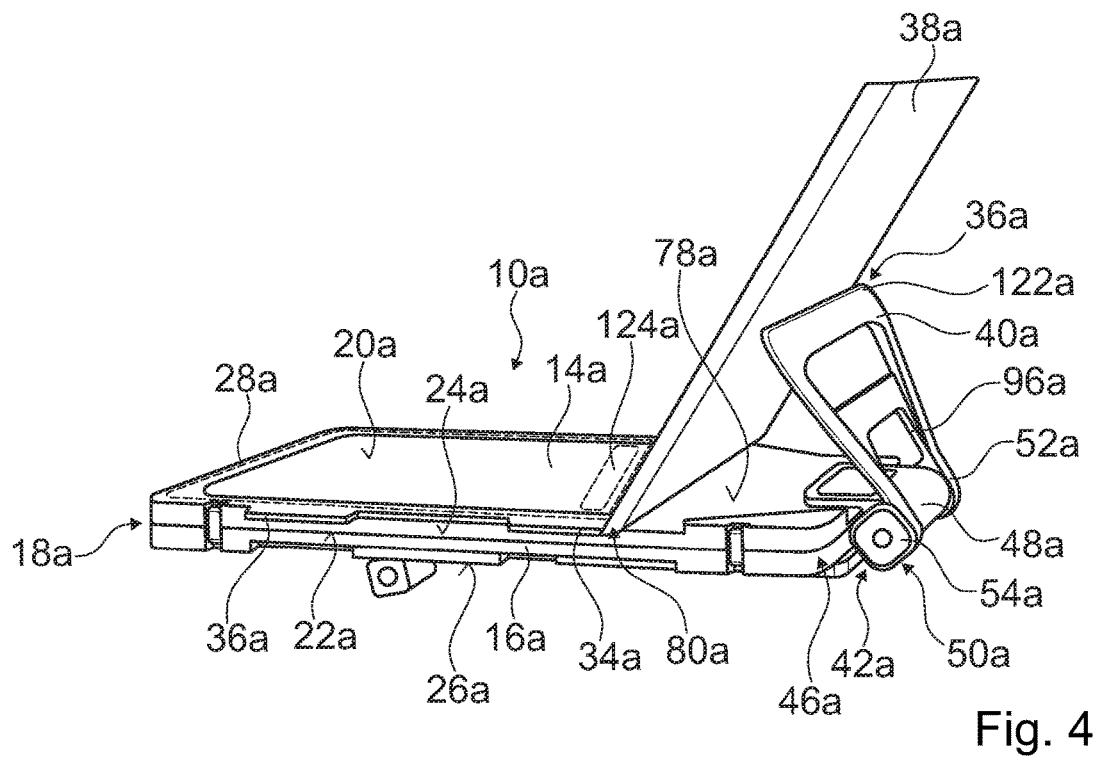
Figure 5:
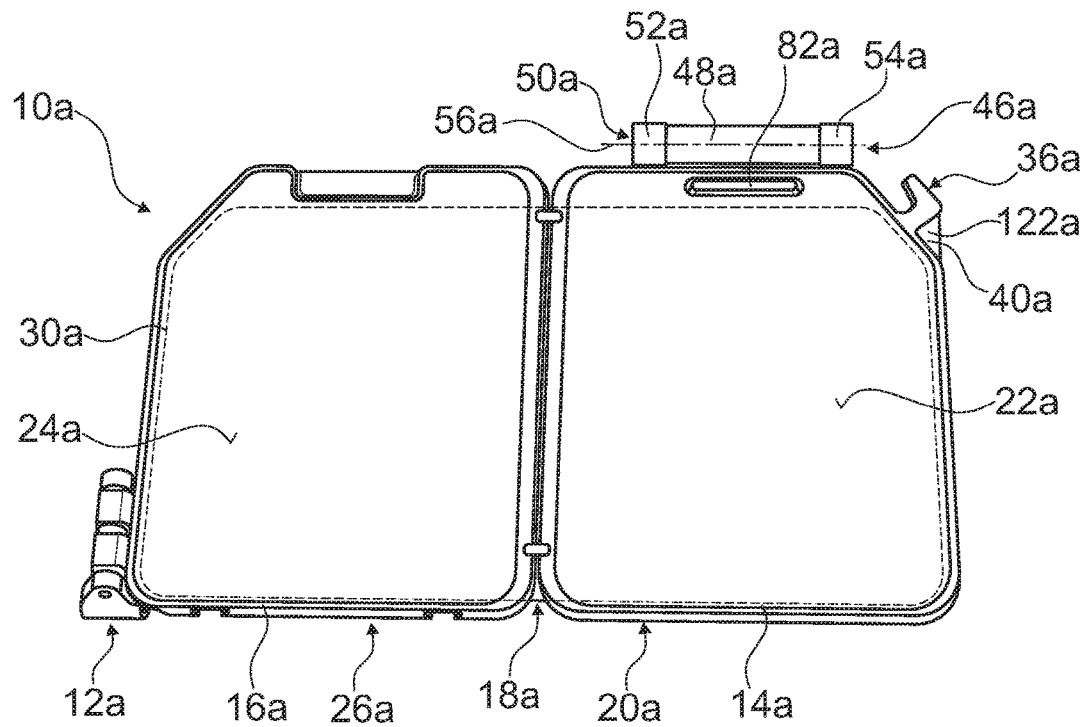
Figure 6:
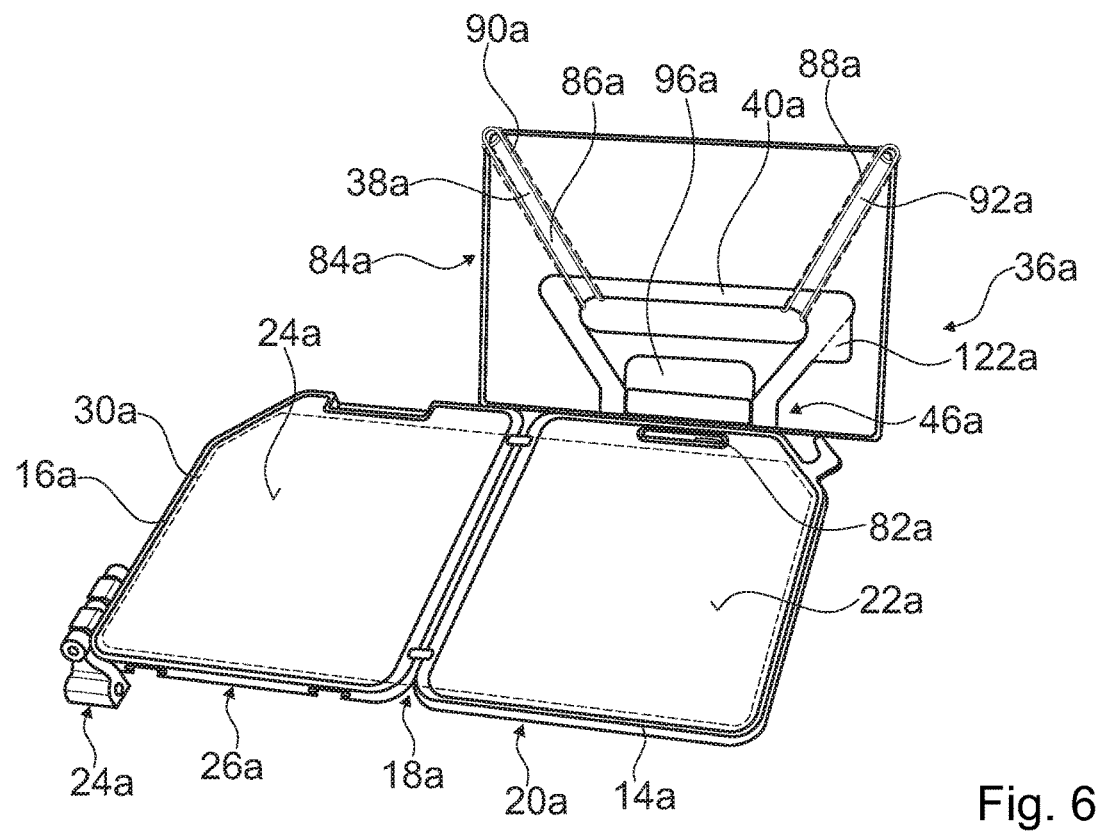
Figure 7:
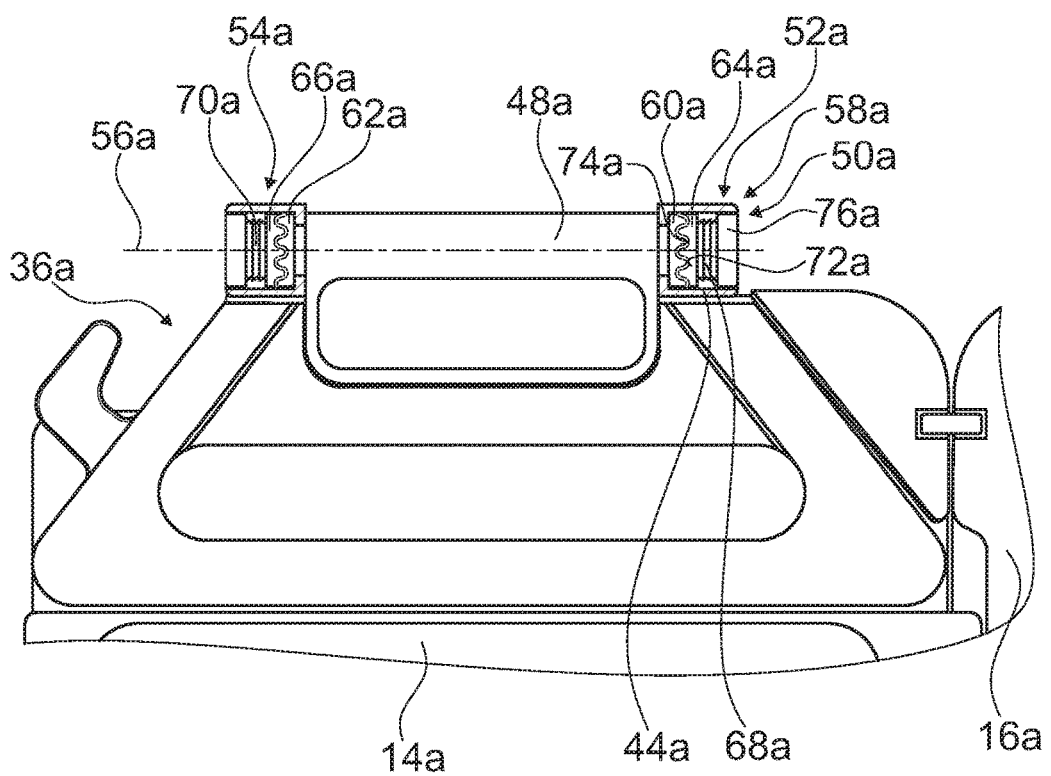
Figure 8:
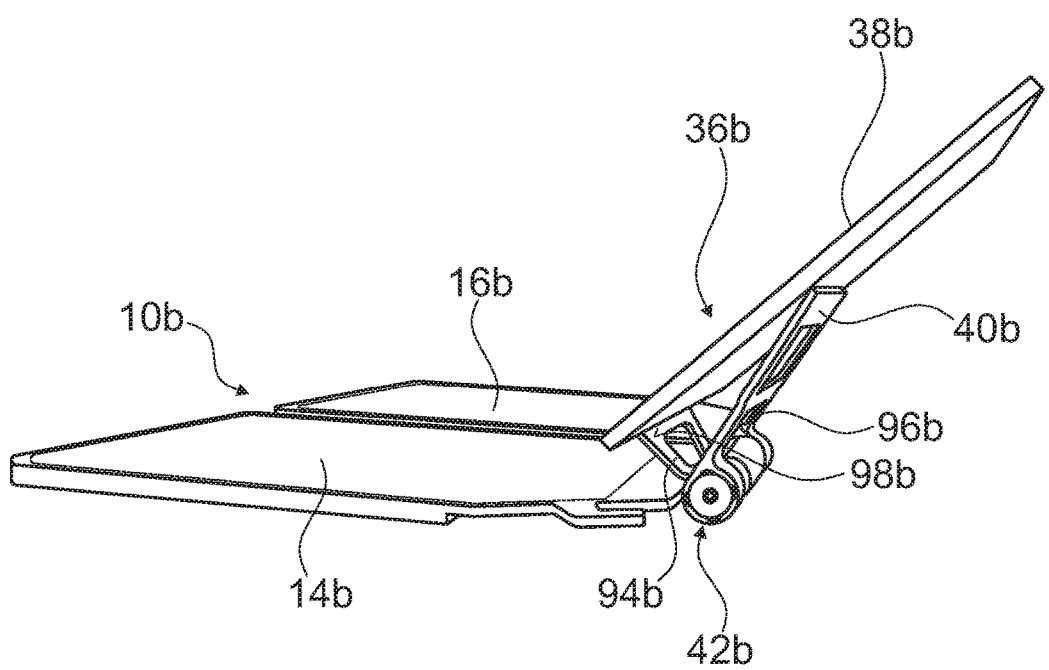
Figure 9:
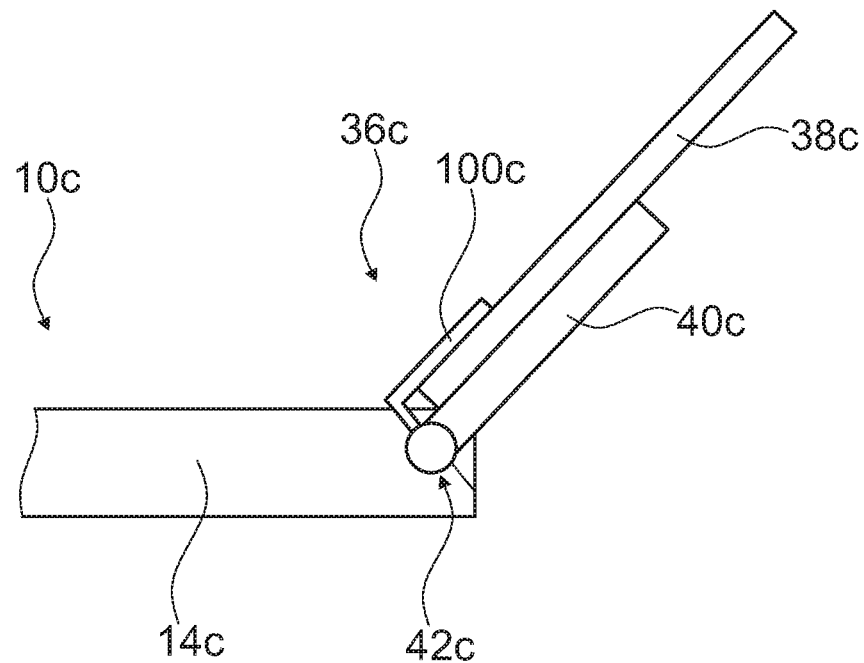
Figure 10:
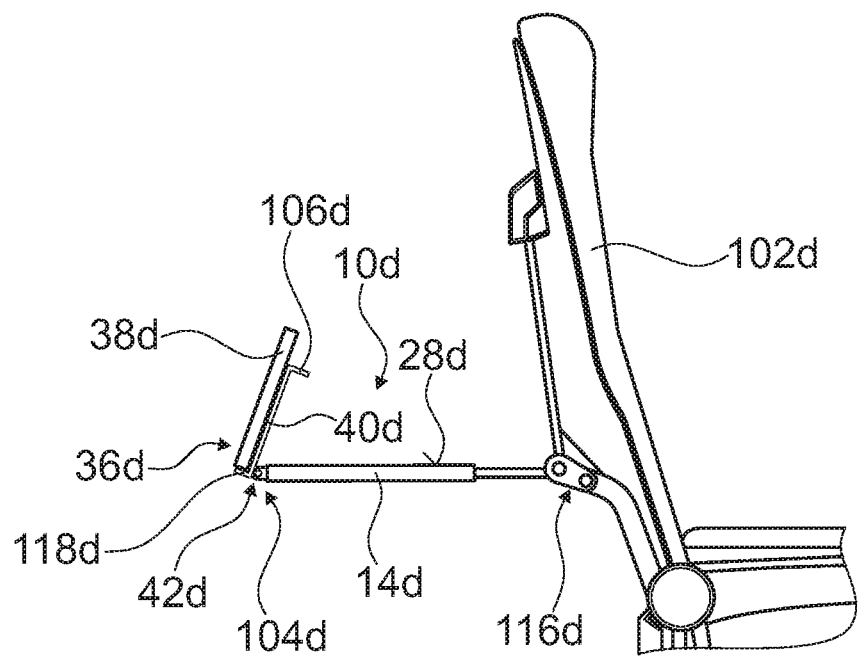
Figure 11:
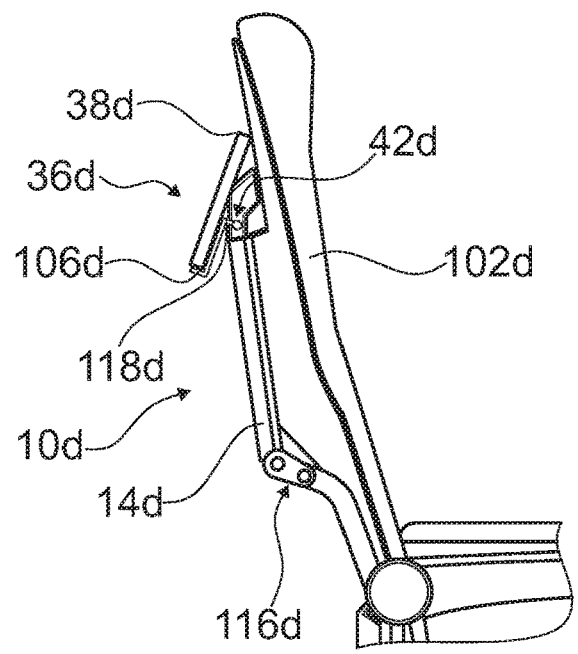
Figure 12:
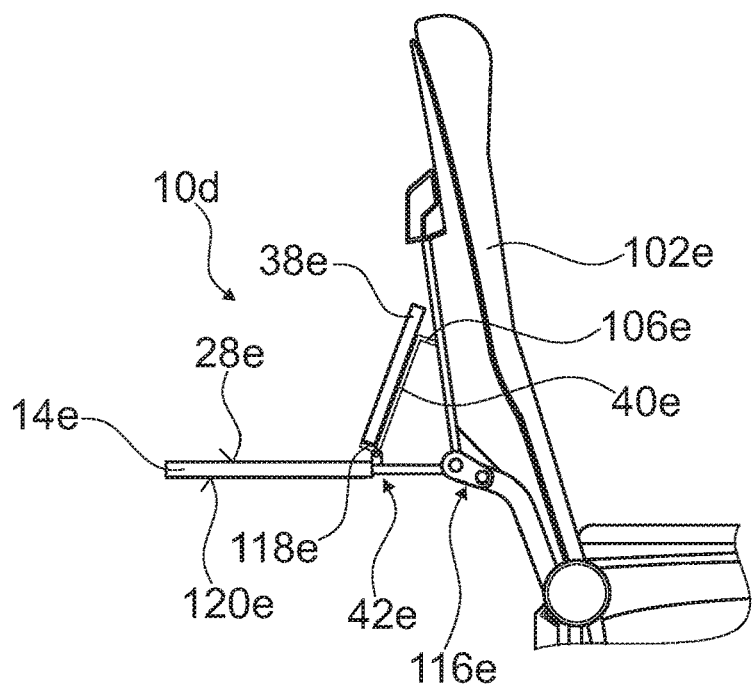
Figure 13:
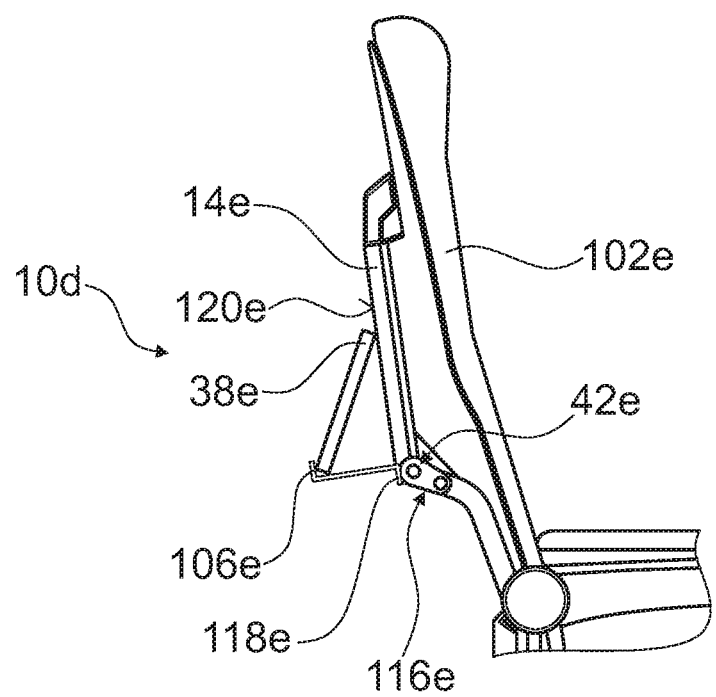

It is shown in:

FIG. 1 a schematic view of an aircraft seat device according to the invention in a first exemplary embodiment with a table module and a PED holder, FIG. 2 a schematic view of the table module in a first operational state, with a holding element of the PED holder in a stowage position, FIG. 3 a schematic view of the table module in the first operational state with the holding element of the PED holder in a first holding position, FIG. 4 a schematic view of the table module in the first operational state with the holding element of the PED holder in a first holding position and with a PED, FIG. 5 a schematic view of the table module in the second operational state, FIG. 6 a schematic view of the table module in the second operational state, with the holding element of the PED holder in a second holding position and with a PED, FIG. 7 a schematic view of a pivot bearing unit with a latching mechanism, FIG. 8 a schematic view of an aircraft seat device according to the invention, in a second exemplary embodiment, FIG. 9 a schematic view of an aircraft seat device according to the invention, in a third exemplary embodiment, FIG. 10 a schematic view of an aircraft seat device according to the invention, in a fourth exemplary embodiment, FIG. 11 another schematic view of the aircraft seat device according to the invention in the fourth exemplary embodiment, FIG. 12 a schematic view of an aircraft seat device according to the invention, in a fifth exemplary embodiment, and FIG. 13 another schematic view of the aircraft seat device according to the invention in the fifth exemplary embodiment.

DESCRIPTION OF THE EXEMPLARY EMBODIMENTS

FIGS. 1 to 7 show a first exemplary embodiment of an aircraft seat device according to the invention. The aircraft seat device is part of an aircraft seat device comprising an aircraft seat 108a. The aircraft seat device is arranged in an aircraft cabin and is mounted on a cabin floor of the aircraft. The aircraft seat 108a is configured to allow a passenger sitting on it. The aircraft seat 108a implements a sitting direction. For this purpose the aircraft seat 108a comprises at least a seat bottom 110a and a backrest 102a. The aircraft seat 108a further comprises two armrests 114a respectively delimiting the seat bottom 110a toward a side. The aircraft seat 108a is herein embodied as part of a seat row 112a. The seat row 112a is herein embodied as a front seat row, with no seat row arranged in front of it. Principally it is also conceivable that the seat row 112a may as well be embodied as any seat row arranged in the aircraft cabin. It is conceivable that the aircraft seat 108a is embodied as a single seat.

The aircraft seat device comprises a table module 10a. The table module 10a is configured to provide, in at least one operational state, a depositing facility, which a passenger sitting on the allocated aircraft seat 108a may deposit objects on. Viewed in the sitting direction, the table module 10a is herein arranged in front of the aircraft seat 108a. The table module 10a is herein embodied as a folding-table module. The table module 10a features a stowage position, in which the table module 10a is pivoted into a stowage space. The stowage space is herein arranged in the armrest 114a. For this purpose the table module 10a comprises a supporting unit 12a which comprises two pivot axes oriented orthogonally to each other. By way of the two pivot axes the table module 10a is pivotable, via the supporting unit 12a, first out of the stowage space about the first pivot axis and then into a usage position about the second pivot axis. The table module 10a comprises a first table element 14a and a second table element 16a. The two table elements 14a, 16a are pivotally coupled with one another. For a pivotable coupling of the first table element 14a with the second table element 16a, the table module 10a comprises a supporting unit 18a. The supporting unit 18a implements a pivot axis, which the two table elements 14a, 16a are pivotable about with respect to one another. The pivot axis of the supporting unit 18a runs in parallel to the second pivot axis of the supporting unit 12a. The supporting unit 18a connects a second end of the first table element 14a and a second end of the second table element 16a. For coupling the table elements 14a, 16a, the supporting unit 18a comprises a first support element, which is rigidly connected to the second end of the first table element 14a, and a second support element, which is rigidly connected to the second side of the second table element 16a. The two support elements of the supporting unit 18a are connected to one another via a support pin, which implements the pivot axis. By way of the supporting unit 18a, the two table elements 14a, 16a are pivotable with respect to each other between a folded-up position and a deployed position. In the folded-up position the first table element 14a is arranged upon the second table element 16a. Herein a second side 22a of the first table element 14a lies upon a first side 24a of the second table element 16a. In the folded-up position, a first side 20a of the first table element 14a faces away from the second table element 16a. In the folded up-position, a second side 26a of the second table element 16a faces away from the first table element 14a. In the deployed position, the two table elements 14a, 16a are arranged one beside the other one. Herein the first table element 14a is, in a pivoting out of the folded-up position into the deployed position, pivoted by 180 degrees with respect to the second table element 16a. In the deployed position, the two table elements 14a, 16a are arranged parallel to one another. In the deployed position, the second side 22a of the first table element 14a and the first side 24a of the second table element 16a face in the same direction. Herein the second side 22a of the first table element 14a and the first side 24a of the second table element 16a face upwards in the deployed position. The supporting unit 18a comprises two blocking elements 32a, 34a. The blocking elements 32a, 34a are configured to restrict the table elements 14a, 16a to a maximum pivot angle, as a result of which said table elements 14a, 16a are, in the deployed position, in a maximum pivoting to each other, arranged in parallel to each other. The blocking elements 32a, 34a are embodied as form-fit elements protruding over the second end of the first table element 14a and arranged on a first side 20a of the first table element 14a. In the deployed position, the blocking elements 32a, 34a, which are embodied as form-fit elements, engage underneath the second table element 16a, thus preventing further pivoting of the table elements 14a, 16a with respect to one another.

The table module 10a features a first operational state and a second operational state. The operational states of the table module 10a implement usage positions of the table module 10a. In the first operational state the table module 10a has been pivoted out of the stowage position and the table elements 14a, 16a are in the folded-up position (cf. FIG. 2). As a result of this, the first table element 14a is in the first operational state arranged upon the second table element 16a. The first side 20a of the first table element 14a herein implements a first table surface 28a. In the first operational state the first table element 14a alone implements the first table surface 28a. The first table surface 28a is herein approximately equivalent to a size of the first table element 14a. In the first operational state the first side 20a of the first table element 14a faces upwards, away from the cabin floor. In the second operational state the table module 10a has been pivoted out of the stowage position and the table elements 14a, 16a are in their deployed positions (cf. FIG. 5). As a result of this, the first table element 14a is arranged side by side with the second table element 16a in the second operational state. The second side 22a of the first table element 14a implements together with the first side 24a of the second table element 16a a second table surface 30a. The second table surface 30a is composed of the first table element 14a and the second table element 16a. The second table surface 30a herein approximately corresponds to a size of the first table element 14a and a size of the second table element 16a. In the second operational state the second side 22a of the first table element 14a and the first side 24a of the second table element 16a are aligned to one another in a plane. The second side 22a of the first table element 14a and the first side 24a of the second table element 16a face in the second operational state upwards, away from the cabin floor. In the second operational state the first side 20a of the first table element 14a and the second side 26a of the second table element 16a face downward, to the cabin floor.

The aircraft seat device comprises a PED holder 36a. The PED holder 36a is configured to support a PED 38a in an operable position on the table module 10a. Herein the PED 38a is, in the operable position, supported on the table module 10a in such a way that a passenger, sitting on the aircraft seat 108a which the table module 10a is allocated to, may operate the PED 38a comfortably and easily. The PED holder 36a comprises a holding element 40a. The holding element 40a is configured to provide a support and/or bracing surface for the PED 38a that is to be supported. The holding element 40a is pivotally connected to the table module 10a. Herein the holding element 40a is fixatable in different positions with respect to the table module 10a. The holding element 40a is embodied as a flat element. The holding element 40a has an approximately trapezoid-shaped contour. The holding element 40a is herein connected to the table module 10a with a small side. A large side faces away from the connection of the holding element 40a to the table module 10a. Herein the large side of the trapezoid-shaped holding element 40a has a length that is equivalent to a width of the first table element 14a. On the large side, the outer edges of the holding element 40a end flush with the outer edges of the first table element 14a. In this way a particularly large bracing edge may be provided for a PED 38a held in the PED holder 36a. The end at the large side of the holding element 40a implements the bracing edge which the PED 38a is braced on in a held state. The holding element 40a comprises a through recess 96a, which is arranged centrally in the holding element 40a and is configured for reducing a weight. Principally it is also conceivable that the holding element 40a is embodied as a bent part. The holding element 40a would then be bent, for example, of a wire or a similar material. Herein the holding element 40a would optionally have a circular cross-section.

For the purpose of pivotally supporting the holding element 40a on the table module 10a, the PED holder 36a comprises a pivot bearing unit 42a. The pivot bearing unit 42a is configured to pivot the holding element 40a by more than 180 degrees. The pivot bearing unit 42a implements a pivot axis 56a, with respect to which the holding element 40a is pivotable to the table module 10a. The pivot axis 56a is herein oriented in a transverse direction extending orthogonally on the sitting direction of the allocated aircraft seat 108a. The pivot bearing unit 42a is mounted on the first table element 14a. The first table element 14a comprises a rear end 46a facing away from the aircraft seat 108a in the operational positions, which the pivot bearing unit 42a is mounted to. The pivot bearing unit 42a comprises a first support element 48a. The first support element 48a of the pivot bearing unit 42a is rigidly connected to the table module 10a. The first support element 48a is connected to the rear end 46a of the first table element 14a. The first support element 48a is herein embodied in a one-part implementation with the first table element 14a. The support element 48a comprises an elongate base body. A cylindrical through hole is arranged in the elongate base body. The base body of the support element 48a extends in parallel to the rear end 46a of the first table element 14a. The support element 48a forms an accommodation for a support pin of the pivot bearing unit 42a. The pivot bearing unit 42a comprises a second support element 50a, which is implemented by the holding element 40a of the PED holder 36a. The second support element 50a is arranged on the narrow end of the holding element 40a. The second support element 50a is embodied by two accommodations 52a, 54a, which are arranged spaced apart from one another. A distance between the two accommodations 52a, 54a of the support element 50a is herein equal to a longitudinal extension of the base body of the first support element 48a. In a mounted state, the base body of the first support element 48a is arranged between the two accommodations 52a, 54a. The accommodations 52a, 54a respectively comprise through holes 44a through which, in the mounted state, the support pin of the pivot bearing unit 42a is guided for a connection to the first support element 48a.

The pivot bearing unit 42a comprises a latching mechanism 58a. The latch mechanism 58a is configured for blocking the holding element 40a in different positions. Herein the latching mechanism 58a has a 60-degree latch profile. The latching mechanism 58a blocks the holding element 40a at angular distances of 60 degrees. A first latch point is pivoted by 60 degrees out of the rest position. A second latch point is pivoted out of the rest position by 120 degrees. A third latch point is pivoted out of the rest position by 180 degrees. A fourth latch point is pivoted out of the rest position by 240 degrees. A fifth latch point is pivoted out of the rest position by 300 degrees. Principally it is also conceivable that the latching mechanism 58a provides a continuous adjustment or comprises a latch profile having different angular distances, e.g. 30 degrees. Principally it is also conceivable that the latch profile features irregular angular distances. The latching mechanism 58a is arranged in the two accommodations 52a, 54a of the second support element 50a. The latching mechanism 58a comprises two locking discs 60a, 62a, two counter elements 64a, 66a and two spring elements 68a, 70a. In each accommodation 52a, 54a respectively one locking disc 60a, 62a, one counter element 64a, 66a and one spring element 68a, 70a are arranged. The functionality of the latching mechanism 58a will therefore be described in the following on the basis of just one side and the corresponding locking disc 60a, the counter element 64a and the spring element 68a. An implementation and a combined action of the locking disc 62a, the counter element 66a and the spring element 70a may be gathered from the following description accordingly. The locking disc 60a is arranged torque-proof on an inner end of the through hole 44a of the accommodation 52a. The locking disc 60a features a circumferential wave contour 72a on its outward-oriented axial side. The counter element 64a, which is arranged axially adjacently to the locking disc 60a, features a wave contour 74a embodied correspondingly to the wave contour 72a of the locking disc 60a. In a mounted state, the counter element 64a is, with its wave contour 74a, in a form-fit contact to the wave contour 72a of the locking disc 60a. The counter element 64a is herein arranged axially displaceably in the through hole 44a of the accommodation 52a. Herein the counter element 64a is supported in a torque-proof fashion with respect to the support pin. The spring element 68a is implemented by a plate spring or a plurality of plate springs. Principally it is also conceivable that the spring element is embodied as a different kind of spring, deemed expedient by someone skilled in the art, e.g. as a spiral spring. The spring element 68a is arranged between the counter element 64a and a fixation element 76a of the support pin. The fixation element 76a is embodied as a screw element and is connected to the support pin. The fixation element 76a is fixedly connected to the support pin via a thread, thus holding the two support elements 48a, 50a together in a mounted state. The fixation element 76a pre-biases the spring element 68a, resulting in the spring element 68a exerting a force onto the counter element 64a that is directed toward the locking disc 60a. Due to the wave contours 72a, 74a of the locking disc 60a and the counter element 64a engaging into one another, the holding element 40a is fixed. The spring element 68a pushes the locking disc 60a and the counter element 64a into contacting one another. When the holding element 40a is pivoted with respect to the table module 10a, the locking disc 60a, which is arranged torque-proof in the through hole 44a of the accommodation 52a, rotates with respect to the counter element 64a. The counter element 64a is herein deflected axially, counter to the spring force of the spring element 68a, by the wave contours 72a, 74a engaging in one another. When, following a further rotation of the locking disc 60a and the counter element 64a, a wave valley and a wave mountain of the correspondingly embodied wave contours 72a, 74a meet, the counter element 64a latches into the locking disc 60a once again, and the holding element 40a is latched in a respective position. By the shape of the wave contours 72a, 74a an angular distance in which the holding element 40a is fixatable to the table module 10a is given.

The PED holder 36a comprises a gripping spot 122a. The gripping spot 122a is implemented by the holding element 40a. The gripping spot 122a implements a region via which the holding element 40a is advantageously operable, i.e. pivotable, by a person. The gripping spot 122a is herein configured to be gripped by a person for pivoting the holding element 40a. The gripping spot 122a is herein arranged in an outer region of the holding element 40a, in particular on its large side. The gripping spot 122a is herein marked by a coloring, making it easily recognizable by a passenger. The gripping spot 122a is herein actuatable by a passenger in both operational states of the table module 10a. In the first operational state of the table module 10a, the holding element 40a is movable out of its stowage position by pulling on the gripping spot 122a. In the second operational state of the table module 10a, the holding element 40a is movable out of its stowage position by pressing on the gripping spot 122a. The PED holder 36a furthermore comprises a pictogram 124a, which is mounted on the table module 10a. The pictogram 124a gives an imaging of the way in which to operate the PED holder 36a. Herein the pictogram 124a is arranged on a first side 20a of the first table element 14a.

The holding element 40a comprises a plurality of first holding positions. In the first holding positions, one of which is shown in FIGS. 3 and 4, the holding element 40a is configured to provide a holding for the PED 38a in the first operational state of the table module 10a. In the first holding positions the holding element 40a is pivoted out of its stowage position by an angle ranging from 5 degrees to 180 degrees to the first table element 14a of the table module 10a. In the first holding positions the holding element 40a is arranged above the first side 20a of the first table element 14a. In the first holding positions, in the first operational state, in which the first side 20a of the first table element 14a implements the first table surface 28a, the PED 38a is supportable between the holding element 40a and the first side 20a of the first table element 14a. In the first holding position, the PED 38a lies upon the first table element 14a with its underside. Herein, in the first holding position of the holding element 40a, 70% of the table surface 28a provided by the first table element 14a in the stowage position of the holding element 40a are still usable for depositing objects.

The holding element 40a comprises a plurality of second holding positions. In the second holding positions, one of which is shown in FIG. 6, the holding element 40a is configured to provide a holding for the PED 38a in the second operational state of the table module 10a. In the second holding positions the holding element 40a is pivoted out of its stowage position with respect to the first table element 14a of the table module 10a by an angle between 181 degrees and 360 degrees, preferably by 240 degrees. In the second holding positions the holding element 40a is arranged above the second side 22a of the first table element 14a. In the second holding positions, the PED 38a is supportable between the holding element 40a and the first side 20a of the first table element 14a in the second operational state of the table module 10a, in which the second side 22a of the first table element 14a implements the second table surface 30a together with the first side 24a of the second table element 16a. In the second holding position, the PED 38a lies upon the first table element 14a with its underside.

The first table element 14a forms a deepening 78a. The deepening 78a is configured to accommodate the holding element 40a in a stowage position of the PED holder 36a. For this purpose the deepening 78a has a contour that corresponds to the contour of the holding element 40a. A depth of the deepening 78a is equivalent to a thickness of the holding element 40a, resulting in the holding element 40a implementing a planar surface with the upper side of the table element 14a in the stowage position. The deepening 78a is arranged on the first side 20a of the first table element 14a. The deepening 78a is arranged in the first side 20a at the rear end 46a of the first table element 14a. The deepening 78a implements a stop 80a. The stop 80a is configured to provide a bracing surface for the PED 38a in one of the first holding positions of the holding element 40a. In a first holding position of the holding element 40a, the PED 38a abuts in an operable position on the holding element 40a with its rear side and abuts on the stop 80a implemented by the deepening 78a with its lower end. For a secure support in the deepening 78a, the PED holder 36a has a coating (not shown in detail) in a region of the stop 80a. The coating is implemented as an anti-slip coating that is configured to increase a friction coefficient in the respective region. Due to the bracing surface formed by the stop 80a, the PED 38a may be braced in a held state and the holding element 40a needs not necessarily engage at a center of mass of the PED 38a to ensure secure standing. As a result, the PED holder 36a has a high degree of variability.

The PED holder 36a comprises a bracing element 82a. The bracing element 82a is configured to provide, in a second holding position of the holding element 40a, a bracing surface for the PED 38a. The bracing element 82a is arranged on the second side 22a of the first table element

14*a*. The bracing element 82*a* is herein embodied as an elevation. Principally it would also be conceivable that the bracing element 82*a* is embodied as a notch. In the region in which the bracing element 82*a* provides the bracing surface for the PED 38*a*, the PED holder 36*a* has a coating (not shown in detail). The coating is implemented as an anti-slip coating that is configured to increase a friction coefficient in the respective region of the bracing surface. In a second holding position of the holding element 40*a*, the PED 38*a* abuts, in an operable position, with its rear side on the holding element 40*a* and with a lower end on the stop 80*a* of the bracing element 82*a*.

The PED holder 36*a* comprises a securing device 84*a*. The securing device 84*a* is configured to secure the PED 38*a*, in a state when it is held in the PED holder 36*a*, from dropping out. The securing device 84*a* comprises two holding elements 86*a*, 88*a*. The holding elements 86*a*, 88*a* are embodied as elastic straps. The two holding elements 86*a*, 88*a* are respectively fixedly connected to the holding element 40*a* with their first ends. On their second ends the holding elements 86*a*, 88*a* respectively comprise a coupling element 90*a*, 92*a*. The coupling elements 90*a*, 92*a* are herein embodied as loops. Via the coupling elements 90*a*, 92*a* the two holding elements 86*a*, 88*a* are couplable with upper edges of the PED 38*a*. To secure a PED 38*a* held in the PED holder 36*a*, the holding elements 86*a*, 88*a* are connectable to upper edges of the PED 38*a* via the coupling elements 90*a*, 92*a*, thus securing the PED 38*a* in the PED holder 36*a*. For this purpose the coupling elements 90*a*, 92*a*, which are embodied as loops, are respectively put over an upper edge of the PED 38*a*.

In FIGS. 8 to 13 four more exemplary embodiments of the invention are shown. The following descriptions and the drawings are substantially restricted to the differences between the exemplary embodiments, wherein regarding identically denominated structural components, in particular regarding structural components having the same reference numerals, the drawings and/or description of the other exemplary embodiments, in particular of FIGS. 1 to 7, may principally also be referred to. For distinguishing the exemplary embodiments, the letter a has been added to the reference numerals of FIGS. 1 to 7.

In the exemplary embodiments of FIGS. 8 to 13 the letter a has been substituted by the letters b to e.

FIG. 8 shows a second exemplary embodiment of the aircraft seat device according to the invention. The aircraft seat device of the second exemplary embodiment is implemented substantially in the same way as the aircraft seat device of the first exemplary embodiment.

The aircraft seat device comprises a table module 10*b*. The table module 10*b* is configured to provide in at least one operational state a depositing facility allowing a passenger sitting on the allocated aircraft seat to lay objects on. The table module 10*b* comprises a first table element 14*b* and a second table element 16*b*. The two table elements 14*b*, 16*b* are pivotally coupled with one another. The table module 10*b* with its table elements 14*b*, 16*b* is implemented in the same way as in the first exemplary embodiment.

The aircraft seat device comprises a PED holder 36*b*. The PED holder 36*b* is configured for supporting a PED 38*b* in an operable position on the table module 10*b*. Herein the PED 38*b* is supported in the operable position on the table module 10*b* in such a way that a passenger sitting on the aircraft seat which the table module 10*b* is allocated to may operate the PED 38*b* comfortably and easily. The PED holder 36*b* comprises a holding element 40*b*. The holding element 40*b* is configured to provide a depositing and/or bracing surface for the PED 38*b* that is to be supported. The holding element 40*b* has an approximately trapezoid-shaped contour. Herein the holding element is connected to the table module 10*b* with a narrow side. A large side faces away from the connection of the holding element 40*b* to the table module 10*b*. The holding element 40*b* comprises a through recess 96*b* that is arranged centrally in the holding element 40*b* and is configured for reducing a weight.

Differently from the first exemplary embodiment of FIGS. 1 to 7, the PED holder 36*b* comprises a pivotable lower bracing element 94*b*. The pivotable bracing element 94*b* is pivotally connected to the holding element 40*b* of the PED holder 36*b*. The pivotable bracing element 94*b* is herein arranged on a lower narrow end of the holding element 40*b*, which faces toward the table module 10*b*. Herein the pivotable bracing element 94*b* is rotatable about a same pivot axis as the holding element 40*b*. The bracing element 94*b* is herein arranged in a region of the through recess 96*b* of the holding element 40*b*. The bracing element 94*b* herein has a contour of the through recess 96*b*. The bracing element 94*b* has a folded-up position, in which the bracing element 94*b* is completely arranged in the through recess 96*b* and is oriented in parallel to the holding element 40*b*. The bracing element 94*b* has two deployed positions. In the deployed positions the bracing element 94*b* is pivoted with respect to the holding element 40*b* and respectively implements a bracing surface 98*b* which is oriented angled to the holding element 40*b* and which the PED 38*b* may be braced upon with its lower end. The bracing element 94*b* is herein pivotable by 180 degrees. The bracing element 94*b* may be used for bracing a PED 38*b* in a first holding position of the holding element 40*b* by pivoting out of the folded-up position in a first direction. By pivoting out of the folded-up position in a second direction, the bracing element 94*b* may be used for bracing the PED 38*b* in a second holding position of the holding element 40*b*.

FIG. 9 shows a third exemplary embodiment of the aircraft seat device according to the invention. The aircraft seat device of the third exemplary embodiment is implemented substantially in the same manner as the aircraft seat devices of the first and second exemplary embodiments.

The aircraft seat device comprises a table module 10*c*. The table module 10*c* is configured to provide in at least one operational state a depositing facility which a passenger sitting on the allocated aircraft seat may deposit objects on. The table module 10*c* comprises a first table element 14*c* and a second table element. The two table elements 14*c* are pivotally coupled with one another. The table module 10*c* with its table elements 14*c* is embodied in the same way as in the first exemplary embodiment. The aircraft seat device comprises a PED holder 36*c*. The PED holder 36*c* is configured to support a PED 38*c* in an operable position on the table module 10*c*. Herein the PED 38*c* is in its operable position supported on the table module 10*c* in such a way that a passenger, sitting on the aircraft seat which the table module 10*c* is allocated to, may operate the PED 38*c* comfortably and easily. The PED holder 36*c* comprises a holding element 40*c*. The holding element 40*c* is configured to provide a support and/or bracing surface for the PED 38*c* that is to be supported. The holding element 40*c* has an approximately trapezoid-shaped contour. Herein the holding element 40*c* is connected to the table module 10*c* with a narrow side. A large side faces away from the connection of the holding element 40*c* to the table module 10*c*. The holding element 40*c* comprises a through recess 96*c* which is arranged centrally in the holding element 40*c* and which is configured for weight reduction.

In contrast to the second exemplary embodiment of FIG. 8, the PED holder 36c comprises, instead of a bracing element, a clamping element 100c. The clamping element 100c is configured to clamp a lower end of the PED 38c arranged in the PED holder 36c between the clamping element 100c and the holding element 40c. Like the bracing element of the second exemplary embodiment, the clamping element 100c is pivotally supported on a lower end of the holding element 40c. The clamping element 100c is herein pre-biased, via a spring element that is not shown in detail, with a closing force acting toward the holding element 40c. For mounting the PED 38c in the PED holder 36c, the clamping element 100c needs to be deflected out of its rest position, when it is folded to the holding element 40c, counter to the closing force of the spring element, resulting in the PED 38c being arrangeable between the clamping element 100c and the holding element 40c. If the clamping element 100c is then released, the clamping element 100c presses the PED 38c against the holding element 40c counter to the closing force of the spring element, thus allowing the PED 38c to be placed between the clamping element 100c and the holding element 40c. If the clamping element 100c is now released, the clamping element 100c pushes the PED 38c against the holding element 40c due to the closing force of the spring element, thus securely fixating the PED 38c in the PED holder 36c.

FIGS. 10 and 11 show a fourth exemplary embodiment of an aircraft seat device according to the invention. The aircraft seat device comprises a table module 10d. Differently from the previous exemplary embodiments, the table module 10d comprises only one table element 14d. The table module 10d is pivotally mounted to a backrest 102d of an aircraft seat which is arranged in front of an aircraft seat which the table module 10d is allocated to. Via a pivot bearing 116d the table module 10d is herein pivotable between a rest position when it is folded to the backrest 102d and a usage position when it is pivoted by approximately 90 degrees with respect to the backrest 102d. FIG. 10 herein shows the usage position of the table module 10d. In the usage position the table element 14d of the table module 10d implements a table surface 28d, which objects are arrangeable on. FIG. 11 shows the folded-up rest position of the table module 10d. In the folded-up rest position the table surface 28d of the table element 14d faces toward the backrest 102d. A rear side 120d of the table element 14d facing away from the table surface 28d faces away from the backrest 102d.

The aircraft seat device comprises a PED holder 36d. The PED holder 36d is configured to support a PED 38d on the table module 10d in an operable position. Herein the PED 38d is supported in the operable position on the table module 10d in such a way that a passenger sitting on the aircraft seat which the table module 10d is allocated to may operate the PED 38d comfortably and easily. In contrast to the previous exemplary embodiments the PED holder 36d is arranged on a front end 104d, which faces towards the allocated aircraft seat in a usage position. The PED holder 36d comprises a holding element 40d. The holding element 40d is pivotable with respect to the table module 10d via a pivot bearing unit 42d. Herein the holding element 40d is pivotable by more than 180 degrees with respect to the table module 10d via the pivot bearing unit 42d. The pivot bearing unit 42d is herein embodied in the same manner as the respective pivot bearing units of the previous exemplary embodiments. The pivot bearing unit 42d herein comprises a latching mechanism (not shown in detail), via which the pivot bearing unit 42d and thus the holding element 40d is/are fixatable in different angle positions with respect to the table element 14d. The holding element 40d is connected to the pivot bearing unit 42d with a first end. On the first end the holding element 40d comprises a bracing element 118d. The bracing element 118d is embodied as an elevation rising from the holding element 40d in a first direction. On a second end the holding element 40d implements a second bracing element 106d that is bent by approximately 90 degrees. The second bracing element 106d is embodied as an elevation extending from the holding element 40d in a second direction that is oriented substantially counter to the first direction in which the first bracing element 118d extends.

In a first holding position of the holding element 40d, the table module 10d is folded to the backrest 102d, wherein the table module 10d is not usable for depositing elements (cf. FIG. 11). In the first holding position the holding element 40d is folded, from a front end 104d to the front of the rear side 120d of the table element 14d. The bracing element 106d herein faces away from the table module 10d. The PED 38d herein lies upon the bracing element 106d with a lower end. An upper end of the PED 38d abuts on the backrest 102d. Herein, on the backrest 102d a securing element (not shown in detail) is mounted, which secures the PED 38d. The securing element is herein embodied as a rubber strap that may be stretched about a portion of the PED 38d for securing the latter.

In a second holding position of the holding element 40d, the table module 10d is folded in the usage position, in which the table module 10d may be used for depositing elements. FIG. 10 shows a second holding position of the holding element 40d. The holding element 40d is in the second holding position folded from the front end over the table surface 28d of the table element 14d of the table module 10d. The PED 38d herein lies upon the first bracing element 118d with a lower end. In a stowage position the holding element 40d of the PED holder 36d is folded to the table module 10d. Herein the table element 14d comprises a recess (not shown in detail) in which to stow the holding element 40d. The recess for stowing the holding element 40d is herein arranged in the rear side 120d of the table element 14d. Principally it would also be conceivable that the recess for stowing the holding element 40d is arranged in an upper side of the table element 14d implementing the table surface 28d.

FIGS. 12 and 13 show a fifth exemplary embodiment of an aircraft seat device according to the invention. The aircraft seat device comprises a table module 10e. Differently from the first four exemplary embodiments, the table module 10e comprises only one table element 14e. The table module 10e is embodied in the same way as the corresponding table module of the fourth exemplary embodiment of FIGS. 10 and 11. The table module 10e is pivotally mounted on a backrest 102e of an aircraft seat that is arranged in front of an aircraft seat which the table module 10e is allocated to. The table module 10e is herein pivotable between a rest position in which it is folded to the backrest 102e and a usage position in which it is pivoted by approximately 90 degrees with respect to the backrest 102d. FIG. 10 herein shows the usage position of the table module 10e. FIG. 11 shows the folded-up rest position of the table module 10e.

The aircraft seat device comprises a PED holder 36e. The PED holder 36e is configured to support a PED 38e in an operable position on the table module 10e. The PED 38e is herein supported in the operable position on the table module 10e in such a way that a passenger, sitting on the aircraft seat which the table module 10e is allocated to, may operate the PED 38e comfortably and easily. In contrast to the above fourth exemplary embodiment of FIGS. 10 and 11, the PED holder 36e is arranged at a rear end 46e of the table module 10e, which faces toward the allocated aircraft seat in a usage position. The PED holder 36e comprises a holding element 40e. The holding element 40e is pivotable with respect to the table module 10e via a pivot bearing unit 42e. The holding element 40e is herein pivotable, via the pivot bearing unit 42e, by more than 180 degrees with respect to the table module 10e. Herein the pivot bearing unit 42e is embodied in the same way as the respective pivot bearing units of the previous exemplary embodiments. Herein the pivot bearing unit 42e comprises a latching mechanism (not shown in detail) via which the pivot bearing unit 42e and thus the holding element 40e is/are fixatable in different angle positions with respect to the table element 14e. The holding element 40e is connected to the pivot bearing unit 42e with a first end. On the first end, the holding element 40e comprises a bracing element 118e. The bracing element 118e is implemented as an elevation rising from the holding element 40e in a first direction. On a second end the holding element 40e implements a second bracing element 106e, which is bent by approximately 90 degrees. The second bracing element 106e is embodied as an elevation extending from the holding element 40e in a second direction, which is substantially oriented counter to the first direction, in which the first bracing element 118e extends.

In a first holding position of the holding element 40e, the table module 10e is folded to the backrest 102e, wherein the table module 10e is not usable for depositing elements (cf. FIG. 13). In the first holding position the holding element 40e is folded from a rear end 46e to the front of a rear side 120e of the table element 14e. The bracing element 106e is herein oriented upwards. The PED 38e herein lies upon the bracing element 106e with a lower end. An upper end of the PED 38e abuts on the rear side 120e of the table element 14e. On the rear side 120e of the table element 14e herein a securing element (not shown in detail) is mounted securing the PED 38e. The securing element is herein embodied as a rubber strap that may be stretched about a portion of the PED 38e for securing the latter.

In a second holding position of the holding element 40e, the table module 10e is folded in the usage position, wherein the table module 10e is usable for depositing elements. FIG. 10 shows a second holding position of the holding element 40e. The holding element 40e is in the second holding position folded from the rear end 46 over a table surface 28e of the table element 14e of the table module 10e. Herein the holding element 40e is arranged in a space between the table element 14e and the backrest 102e, as a result of which the table surface 28e is not reduced due to the holding element 40e. The PED 38e herein lies upon the first bracing element 118e with a lower end. The PED 38e lies upon the table element 14e with its lower end in the first holding position. Herein, in the first holding position of the holding element 40e, 95% of the table surface 28e provided by the first table element 14e in the stowage position of the holding element 40e are still usable for depositing objects. In a stowage position the holding element 40e of the PED holder 36e is folded to the table module 10e, like in the fourth exemplary embodiment of FIGS. 10 and 11.

REFERENCE NUMERALS 10 table module
12 supporting unit
14 table element
16 table element
18 supporting unit
20 first side
22 second side
24 first side
26 second side
28 table surface
30 table surface
32 blocking element
34 blocking element
36 PED holder
38 PED
40 holding element
42 pivot bearing unit
44 through hole
46 rear end
48 support element
50 support element
52 accommodation
54 accommodation
56 pivot axis
58 latching mechanism
60 latch disc
62 latch disc
64 counter element
66 counter element
68 spring element
70 spring element
72 wave contour
74 wave contour
76 fixation element
78 recess
80 stop
82 bracing element
84 securing device
86 holding element
88 holding element
90 coupling element
92 coupling element
94 bracing element
96 through recess
98 bracing surface
100 clamping element
102 backrest
104 end
106 bracing element
108 aircraft seat
110 seat bottom
112 seat bottom
114 armrest
116 pivot bearing
118 bracing element
120 rear side
122 gripping point
124 pictogram

The invention claimed is:
1. An aircraft seat device, comprising:
a table module; and
a PED holder configured for supporting a PED in an operable position on the table module,
wherein
the PED holder comprises at least one holding element which is pivotally connected to the table module,
the PED holder comprises a pivot bearing unit, which is configured for pivoting the holding element by more than 180 degrees,
the table module includes a first table element, the holding element is configured to be pivoted into a first holding position in which a first angle between the holding element and a stowage position on a first surface of the first table element is between 5 and 180 degrees, the holding element is configured to be pivoted into a second holding position in which a second angle between the holding element and the stowage position is between 5 and 180 degrees.

2. The aircraft seat device according to claim 1, wherein the table module comprises at least one first table element and at least one second table element which is supported pivotally to the first table element, wherein, in a first operational state, the first table element alone forms a first table surface, wherein in a folded-up position the first table element is arranged upon the second table element, and, in a second operational state, the two table elements together form a second table surface, wherein in a deployed position, the two table elements are arranged one beside the other one, wherein the first table element is, in a pivoting out from the folded-up position into the deployed position, pivoted by 180 degrees with respect to the second table element.

3. The aircraft seat device according to claim 2, wherein the holding element is, in at least one first holding position, configured to provide a holding for a PED in the first operational state of the table module and is, in at least one second holding position, configured to provide a holding for a PED in the second operational state of the table module.

4. The aircraft seat device at least according to claim 2, wherein the first table element has a rear end, which the pivot bearing unit is mounted to.

5. The aircraft seat device at least according to claim 2, wherein the PED holder comprises at least one bracing element which is configured, at least in a second holding position, to provide a bracing surface for the PED and is for this purpose mounted on the second side of the first table element.

6. The aircraft seat device at least according to claim 2, wherein the first table element is in the first operational state arranged on the second table element and implements the table surface with a first side.

7. The aircraft seat device at least according to claim 2, wherein the first table element is in the second operational state deployed beside the second table element, implementing, with its second side, the second table surface together with a first side of the second table element.

8. The aircraft seat device according to claim 1, wherein the pivot bearing unit implements a pivot axis which is oriented in a transverse direction extending orthogonally on a sitting direction of an allocated aircraft seat.

9. The aircraft seat device according to claim 1, wherein the pivot bearing unit comprises a latching mechanism, which is configured for blocking the holding element in different positions.

10. The aircraft seat device according to claim 1, wherein the first table element implements a recess, in which the holding element of the PED holder is arranged in a stowage position.

11. The aircraft seat device according to claim 10, wherein the recess is arranged in a first side of the first table element.

12. The aircraft seat device according to claim 10, wherein the recess implements a stop which is configured, in the at least one first holding position, to provide a bracing surface for the PED.

13. The aircraft seat device at least according to claim 1, wherein the table module comprises only one table element that has a rear end which the pivot bearing unit is mounted on.

14. The aircraft seat device at least according to claim 1, wherein the holding element is a flat element extending from the pivot bearing unit.

15. The aircraft seat device at least according to claim 1, wherein
the holding element is configured to be pivoted and fixed into the first holding position, and
the holding element is configured to be pivoted and fixed into the second holding position.

16. The aircraft seat device at least according to claim 1, wherein
the holding element is configured to be pivoted and fixed into a plurality of first holding positions such that a corresponding plurality of different first angles between the holding element and the stowage position in each of the plurality of first holding positions are each between 5 and 180 degrees, and
the holding element is configured to be pivoted and fixed into a plurality of second holding positions such that a corresponding plurality of different second angles between the holding element and the stowage position in each of the plurality of second holding positions are each between 181 and 360 degrees.

17. An aircraft seat device, comprising:

a table module; and a PED holder configured to support a PED in an operable position on the table module, wherein the table module comprises at least one first table element and at least one second table element which is supported pivotally to the first table element, in a first operational state, the first table element alone forms a first table surface, in a folded-up position the first table element is arranged upon the second table element, and, in a second operational state, the two table elements together form a second table surface, in a deployed position, the two table elements are arranged one beside the other one, the first table element is, in a pivoting out of the folded-up position into the deployed position, pivoted by 180 degrees with respect to the second table element, the PED holder comprises at least one holding element which is pivotally connected to the table module, the PED holder comprises a pivot bearing unit, which is configured for pivoting the holding element by more than 180 degrees, the holding element is configured to be pivoted into a first holding position, wherein in the first holding positions the holding element is arranged above a first side of the first table element, and the holding element is configured to be pivoted into a second holding position, wherein in the second holding positions the holding element is arranged above a second side of the first table element.

* * * * *